United States Patent [19]

Murao et al.

[11] Patent Number: 5,058,091
[45] Date of Patent: Oct. 15, 1991

[54] OPTICAL PICKUP DEVICE

[75] Inventors: Yugo Murao, Osaka; Masao Nakamura, Nara; Tsutomu Nakamura, Akashi, all of Japan

[73] Assignee: Sharp Kabushiki Kaisha, Osaka, Japan

[21] Appl. No.: 341,422

[22] Filed: Apr. 21, 1989

[30] Foreign Application Priority Data

Apr. 25, 1988 [JP] Japan .................. 63-101948

[51] Int. Cl.⁵ .............................. G11B 17/22
[52] U.S. Cl. .................. 369/44.21; 369/112
[58] Field of Search ............ 369/112, 44.21, 44.23, 369/109, 120, 116

[56] References Cited

U.S. PATENT DOCUMENTS

| | | | |
|---|---|---|---|
| 4,853,919 | 8/1989 | Miyawaki et al. | 369/112 |
| 4,855,986 | 8/1989 | Taki | 369/44.23 |
| 4,910,723 | 3/1990 | Yamamoto | 369/44.23 |

Primary Examiner—Roy N. Envall, Jr.
Assistant Examiner—Hindi Nabil

[57] ABSTRACT

An optical pickup device includes a light source for emitting light beam onto a recording medium. A lens is provided in an optical path between the light source and the recording medium. The lens converges the light beam to create a focusing spot on the recording medium. A tracking error detector receives a light beam reflected from the recording detector also receives a reflected light beam to detect a focusing error. A controller receives an output from the tracking error detector and the focusing error detector to produce a tracking error correction signal and a focusing error correction signal. A deflection angle adjuster is provided in the optical path and is responsive to the tracking error correction signal. The angle adjuster adjusts a deflection angle of the light beam. A refractive index adjuster is provided in the optical path and is responsive to the focusing error correction signal. The refractive index adjuster adjusts a refractive index of the light beam.

7 Claims, 3 Drawing Sheets

$Sf = (a+c)-(b+d)$ $St = A - B$

OPTICAL PICKUP DEVICE

BACKGROUND OF THE PRESENT INVENTION

1. Field of the Invention

The present invention relates to an optical pickup device and more particularly, it relates to an optical pickup device which is used as a pickup device in a CD player for reproducing optical information on a recording medium.

2. Description of the Prior Art

A conventional optical pickup device disclosed in U.S. Pat. Nos. 4,678,276 and 4,473,274 reads a signal with micro light beam. In such a device, an objective lens of the optical pickup device is mechanically moved in a focusing direction and a tracking direction, for example, by a two-shaft actuator in order to read a signal with high accuracy, and thereby the focus of light beam follows a signal arranged on a track on a recording medium.

However, it is necessary to use a lot of precision machine parts to move the objective lens mechanically with high accuracy. As a result, an optical system has a large-size and its weight is also increased. In addition to that, its manufacturing process is complicated to cause an increase in manufacturing cost. Also, dust laying on the precision machine parts makes operation unstable, and therefore the maintenance of the device is difficult.

SUMMARY OF THE INVENTION

An optical pickup device, according to the present invention, comprises a light source for emitting light beam to a recording medium having a track line in which information is recorded; lens means, provided in an optical path from the light source to the recording medium, for converging the light beam to make a focusing spot having a predetermined diameter on the recording medium; reading means for receiving the light beam reflected from the recording medium and for reading information on the track; tracking error detecting means for receiving the light beam reflected from the recording medium and for detecting a tracking error caused by a deviation of the light beam spot formed on the recording medium in a transverse direction relative to the track; focusing error detecting means for receiving the reflected light beam and for detecting a focusing error caused by a distance variation between the lens means and the recording medium; control means for receiving an output from the tracking error detecting means and the focusing error detecting means and for outputting a tracking error correction signal and a focusing error correction signal; deflection angle adjusting means, provided in the optical path, for receiving the tracking error correction signal and for adjusting a deflection angle of the light beam; and refractive index adjusting means provided in the optical path for receiving the focusing error correction signal and for adjusting a refractive index of the light beam.

DESCRIPTION OF THE PREFERRED EMBODIMENT

According to the present invention, a refractive index adjusting means may be any refractive index adjusting device known in the art. Specifically, an electro-optical device of which refractive index is varied through Pockels effect or Kerr effect may be used. Materials for such an electro-optical device include, for example, a crystal of $KH_2PO_4$ (KDP), $LiTaO_3$, $LiNbO_3$ having Pockels effect and transparent ceramics, such as PLZT, having Kerr effect. A deflection angle adjusting means according to the present invention may be any deflection angle adjusting device known in the art. Specifically, an acousto-optical device in which the traveling direction of light, or the polarization angle of light, is varied through Bragg diffraction may be used. Materials for such an acousto-optical device include a monocrystal of $LiNbO_3$, $PbMoO_4$, $TeO_2$, Ge or the like, dense fling glass, chalcogenide glass, fused quartz and the like.

An optical pickup device, according to the present invention, may be applied mainly to an optical disc memory such as a video disc or a compact disc. Preferably, a laser diode having an oscillation wavelength of 500-1000 nm is used as a light source for emitting light beam upon a recording medium. As a lens device for converging the light beam onto the recording medium, a combination of three to four glass lenses, a plastic lens or the like is preferably used. A tracking error detection device is preferably a plurality of optical detectors such as photodiodes for detecting a tracking error by a method generally known as a 3-beam method. A focusing error detection device is preferably a plurality of detectors such as photodiodes for detecting a focusing error by a method generally known as an astigmatism method. One or a combination of the optical detectors for detecting a tracking error or a focusing error can be used as a reading device for reading information from a track on the recording medium.

An embodiment of the present invention will now be described in conjunction with the drawings. However, the description of the embodiment is not provided for the purpose of the limitation.

Figure 1:
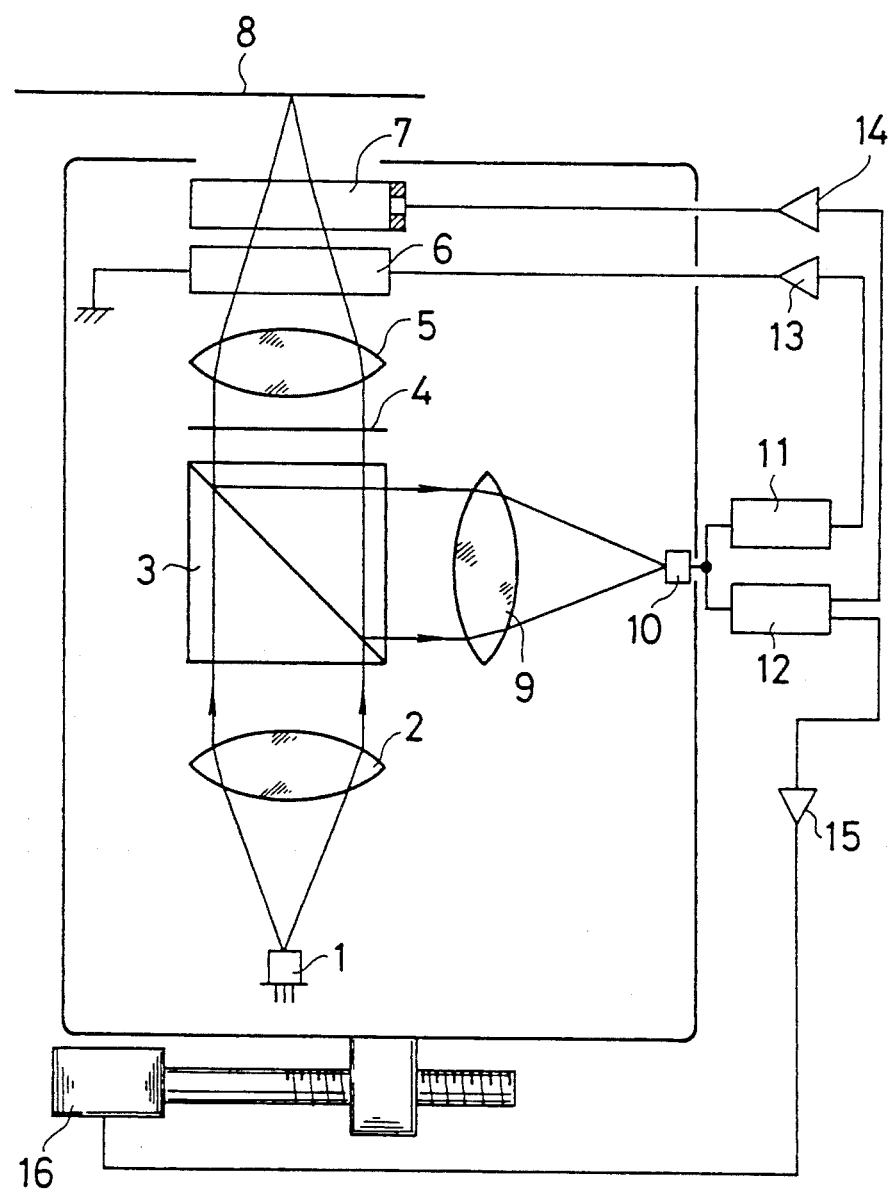
FIG. 1 is a diagram showing a construction of an embodiment according to the present invention.

FIG. 1 is a diagram illustrating a construction of an embodiment of the optical pickup device according to the present invention. Referring to FIG. 1, the device includes a laser diode 1 emitting laser beam, a collimator lens 2, a half prism 3, a ¼ wavelength plate 4, an objective lens 5, an electro-optical device 6 adjusting the refractive index of beam passing therethrough by utilizing an applied voltage, an acousto-optical device 7 adjusting deflection angle of the passing beam by utilizing a frequency of an applied acoustic wave, an optical disc 8 having track lines with signals recorded therein a lens 9 for converging light which is reflected from the disc 8 and emitted by the half prism 3, an optical detector 10 for receiving the beam converged by the lens 9, a correction circuit 11 for receiving a signal from the optical detector 10 and for correcting a focusing error, a correction circuit 12 for receiving an output from the optical detector 10 and for correcting a tracking error, a driving circuit 13 for adjusting the voltage applied to the electro-optical device 6 in response to an output from the correction circuit 11, a driving circuit 14 for adjusting the frequency of an ultrasonic wave applied to the acousto-optical device 7 in response to the output from the correction circuit 12, and a driving circuit 15 for driving a motor 16 when a tracking error is beyond the limit the driving circuit 14 can correct and for correcting a deviation of the beam from the track by translating the whole pickup device.

In such a construction, a laser beam emitted from the laser diode 1 is transformed into parallel rays of light by the lens 2 and is passed through the half prism 3 and the ¼ wavelength plate 4. This light is then converged by the objective lens 5 and passes through the electro-optical device 6 and the acousto-optical device before reaching the optical disc. The beam reflected from the track surface of the disc passes through the acousto-optical device 7 and the electro-optical device 6 before being transformed into parallel rays of light by the objective lens 5. The light then passes through the ¼ wavelength plate 4 and the half prism 3 before being converged into the optical detector 10 by the lens 9.

Figure 2:
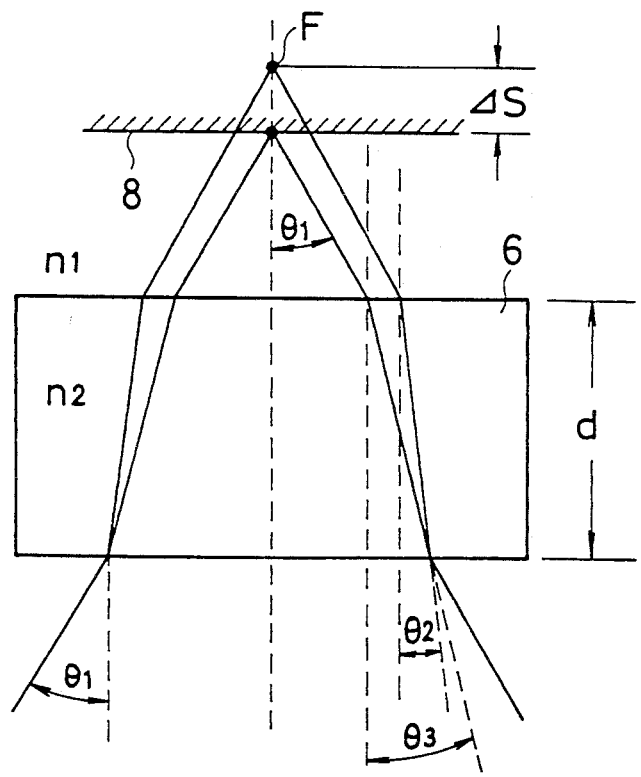
FIGS. 2 and 3 are diagram illustrating a function of the embodiment of Figure.

FIG. 2 is a diagram showing a function of the electro-optical device 6. The beam traveling from the objective lens 5 to the disc 8 reaches the disc 8 through the electro-optical device 6. If the focus of the beam is $\Delta S$ behind the surface of the disc, the focus comes upon the disc 8 by lowering the refractive index of the electro-optical device 6 from $n_2$ to $n_3$.

$\Delta S$ is given by the following equations;

$$\Delta S = d \times (\tan \theta_3 - \tan \theta_2)/\tan \theta_1 \qquad (1)$$

$$n_1 \sin \theta_1 = n_2 \sin \theta_2 = n_3 \sin \theta_3 \qquad (2)$$

where $n_1$ is a refractive index of an external medium of the electro-optical device 6 (e.g., the air), $\theta_1$ is an angle of incidence of the light beam into the electro-optical device 6, $\theta_2$ is a refractive angle when the refractive index of the electro-optical device 6 is $n_2$, $\theta_3$ is a refractive angle when the refractive index of the electro-optical device 6 is changed to $n_3$ and d is a thickness of the electro-optical device 6.

Figure 3:
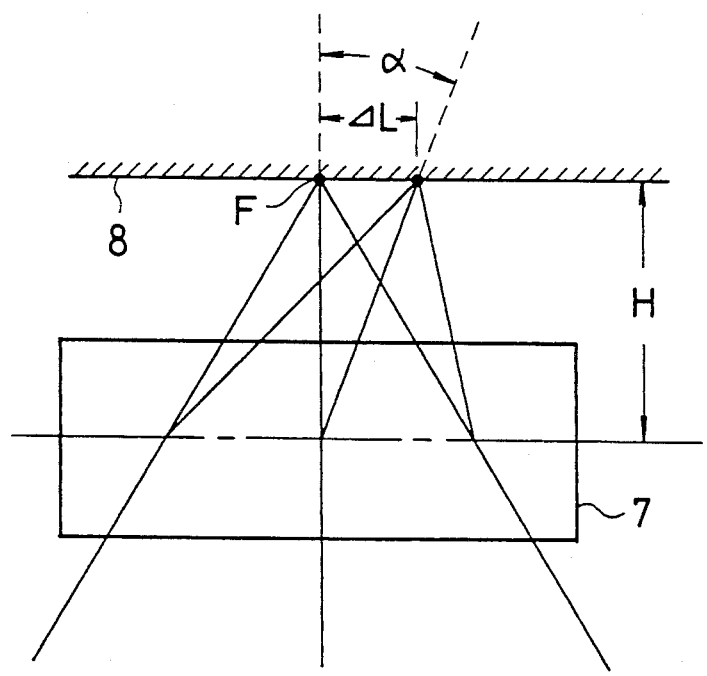

FIG. 3 is a diagram illustrating a function of the acousto-optical device 7. The beam passing through the objective lens 5 and the electro-optical device 6 to the disc 8 is deflected by angle $\alpha$ by the acousto-optical device 7, so that the position of the beam focus F is displaced by $\Delta L$ on the surface of the disc 8. Thus, the position of the beam focus in the tracking direction is adjusted. $\Delta L$ is calculated with the following equation within a range of relatively small $\alpha$;

$$\Delta L = H \tan \alpha \qquad (3)$$

where H is a distance between the acousto-optical device 7 and the disc 8. When a focusing error is caused, the correction circuit 11 calculates a correction amount based upon a signal from the optical detector 10 to apply it to the driving circuit 13. Since the driving circuit 13 adjusts voltage applied to the electro-optical device 6 in accord with the correction amount, the position of the beam focus in the focusing direction is adequately corrected. When a tracking error is caused, the correction circuit 12 calculates a correction amount based upon an output from the optical detector 10 to apply a signal corresponding to it to the driving circuit 14. The driving circuit 14 adjusts a frequency of an ultrasonic wave supplied to the acousto-optical device 7, and thereby a tracking-directional deviation of the beam incident on the disc 8 is corrected. When an error in the tracking direction is beyond the range which can be corrected by the driving circuit 14, the driving circuit 15 actuates the motor 16 to translate the whole pickup device and grossly adjust a focal position of a laser outgoing light.

Figure 4:
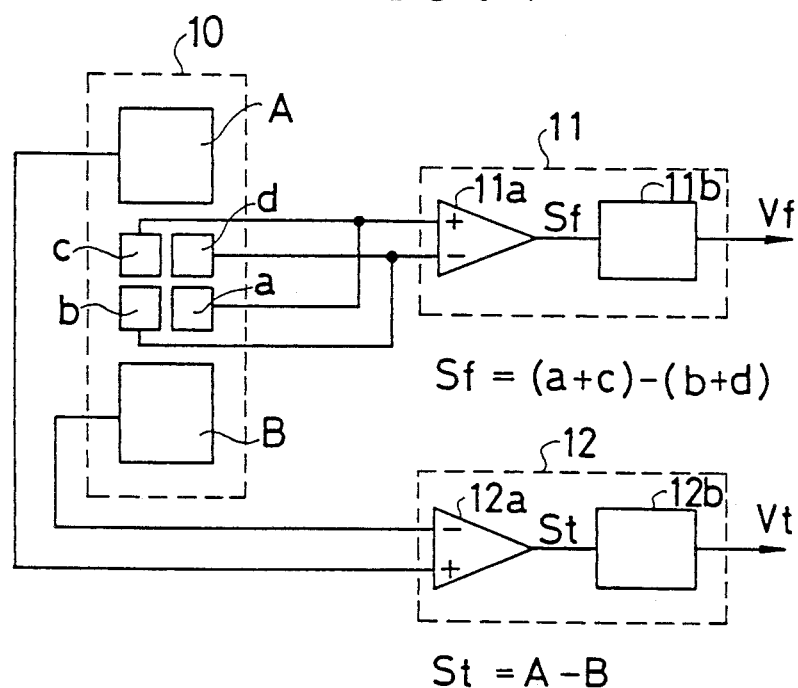
FIGS. 4, 5 and 6 are diagrams showing, in detail, the main portions of FIG. 1.

In this embodiment, an oscillation wavelength of the laser diode 1 is 700 nm, and the objective lens 5 is a glass lens having a numerical aperture of 0.5. A diffraction grating (not shown) is provided between the collimator lens 2 and the half prism 3 for dividing a light beam into three beams so that a tracking error can be detected by a 3-beam method. A focusing error is detected by an astigmatism method. The optical detector 10 and the correction circuits 11 and 12 have a well-known construction as shown in FIG. 4 for detecting an error by the 3-beam and astigmatism methods. For example, the optical detector 10 includes photodiodes A, B and quartered photodiodes a, b, c, d. A focusing error is detected depending upon each amount of the light beam received by the respective central quartered photodiodes. An operation device 11a calculates $(a+c)-(b+d)$ based upon each received light amount of those photodiodes to output a signal $S_f$. When the light beam is focused just upon the disc 8, $S_f=0$, and when focused before and after the disc 8, $S_f>0$ or $S_f<0$. When $S_f>0$, a voltage adjusting device 11b permits the output voltage $V_f$ to fall until $S_f=0$, and when $S_f<0$, it permits the output voltage $V_f$ to rise until $S_f=0$.

A tracking error is detected depending upon an amount of the light beam received by the photodiodes A and B on the opposite ends of the optical detector 10. An operation device 12a calculates $A-B$ with respective amount of the received light by those photodiodes to output a signal $S_t$. When the light beam is focused just upon a track of the disc 8, $S_t=0$, and when the light beam is focused on the left or the right side of a track, $S_t>0$ or $S_t<0$. A voltage adjusting device 12b permits the output voltage $V_t$ to fall until $S_t=0$ when $S_t>0$, and it permits the output voltage $V_t$ to rise until $S_t=0$ when $S_t<0$. Information recorded on tracks is detected by an operation device (not shown) which sums up outputs from the photodiodes a, b, c, d.

Figure 5:
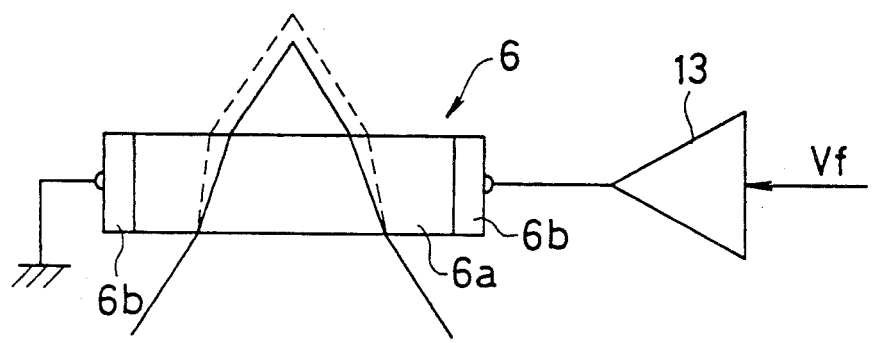

As shown in FIG. 5, the electro-optical device 6 includes an electro-optical medium a and electrodes 6b and 6c placed at the opposite ends thereof. The driving circuit 13 is a high voltage generation circuit for applying voltage of 0−40 kV in proportion to the input voltage $V_f$ between those electrodes. The electro-optical medium 6a is made of PLZT [$(Pb_{1-x}La_x)(Zr_yTi_{1-y})_{1-z/4}O_3$] crystals. The composition ratio of La/Zr/Ti is 9/65/35. The thickness is 3000 μm, and the distance between the electrodes 6b and 6c is 1 cm. In the case that an electric field E is applied to a PLZT crystal, a secondary electro-optical effect, or Kerr effect causes its refractive index to decrease by $\Delta n$. $\Delta n$ is given by $$\Delta n = (\tfrac{1}{2}) n^3 \times R \times E^2 \qquad (4)$$

where n is a refractive index when no electric field exists and R is a secondary electro-optical constant. In a PLZT crystal having the above composition ratio, R is equal to $9.116 \times 10^{-16} (m^2/v^2)$ and n is equal to 2.5. Accordingly, when the maximum voltage of 40 kV is applied between the electrodes 6b and 6c, E=40 kV/cm. In accordance with the equation (4), $\Delta n=0.114$. In other words, n is decreased from 2.5 to 2.386. Then, assuming that in the equations (1) and (2), $n_1=1$ (the refractive index of the air), $n_2=2.5$, $n_3=2.386$, $\theta_1=\sin^{-1} 0.5=30$ deg (the lens numerical aperture is 0.5), $$\Delta S = 1.765 \times 10^{-2} \times d \quad (5)$$

Since $d = 3000$ μm in this embodiment, $\Delta S = 53$ μm in accordance with the equation (5). That is, an adjustment range of the focusing position is 53 μm.

Figure 6:
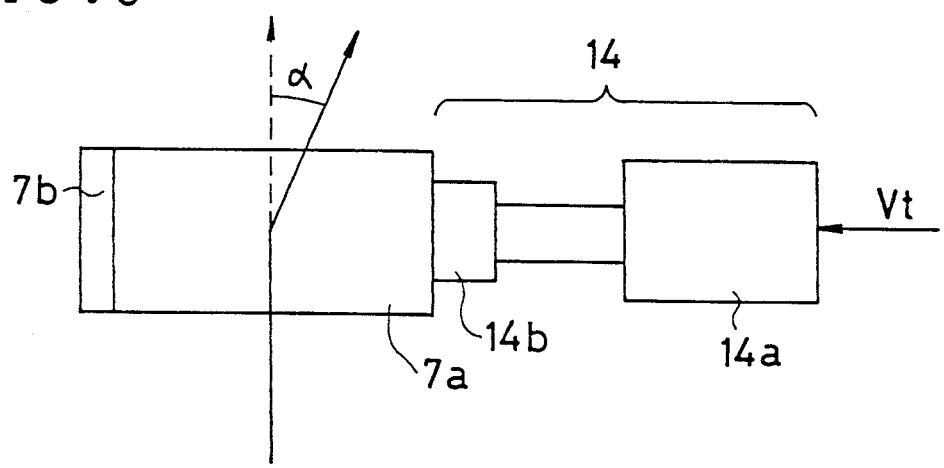

The acousto-optical device 7, as shown in FIG. 6, includes an acousto-optical medium 7a, a piezoelectric vibrator 14b bonded to one end surface thereof and a sound absorbing member 7b bonded to the other end surface for preventing the reflection of an ultrasonic wave. The driving circuit 14 includes a signal generation circuit 14a for supplying an alternating voltage of 0−2 GHz in proportion to the input voltage $V_t$ to the piezoelectric vibrator 14b. The piezoelectric vibrator 14b receives an alternating voltage to apply an ultrasonic wave having the same frequency as in the optical medium 7a. The optical medium 7a is made of a crystal of $LiNbO_3$. When a ultrasonic wave with the frequency f Hz is applied to the $LiNbO_3$ crystal, the deflection angle is varied by α by an acousto-optical effect. α is given by the following equation;

$$\alpha = \lambda \times f / v \quad (6)$$

where λ is an incoming beam wavelength and v is an acoustic velocity in the crystal. In the $LiNbO_3$ crystal, v is equal to $6.57 \times 10^3$ m/sec and λ is equal to 700 nm. When the maximum ultrasonic wave of 2 GHz is applied to the crystal by the piezoelectric vibrator 14b, $\alpha = 0.213$ rad $= 12.21$ deg from the equation (6). Therefore, given in accordance with the equation (3) is the following;

$$\Delta L = 0.2164 \times H \quad (7)$$

When $H = 500$ μm in this embodiment, $\Delta L = 108$ μm in accordance with the equation (7), that is, an adjustment range of the tracking position is 108 μm.

If the optical pickup device according to the present invention is used to reproduce information on a compact disc having a track of 1.6 μm in track pitch, 0.5 μm in track width (pit width), and 0.11 μm in pit depth, it is recognized that an focusing error is not greater than ±1 μm and a tracking error is not greater than ±0.2 μm.

According to the present invention, the focusing direction and the tracking direction of light beam can be adjusted without mechanical control of an objective lens. Consequently, an optical pickup device is provided which is small and has a small number of components, is suitable for the mass production, and further has a high resolution.

What is claimed is:

1. An optical pickup device comprising;

a light source for emitting a light beam onto a recording medium having a track in which information is recorded;

lens means, provided in an optical path between said light source and said recording medium, for converging said light beam to create a focusing spot having a predetermined diameter on said recording medium;

reading means for receiving the light beam reflected from said recording medium and for reading information recorded on said track according to the received light beam;

tracking error detecting means for receiving the light beam reflected from said recording medium and for detecting a tracking error caused by a deviation between a position of said light beam spot formed on said recording medium and said track, said deviation being in a transverse direction relative to said track;

focusing error detecting means for receiving the reflected light beam and for detecting a focusing error caused by a distance variation between said lens means and said recording medium;

control means, responsive to said tracking error detecting means and said focusing error detecting means, for generating a tracking error correction signal and a focusing error correction signal;

deflection angle adjusting means, provided in said optical path and responsive to said tracking error correction signal, for adjusting a deflection angle of said light beam; and refractive index adjusting means, provided in said optical path and responsive to said focusing error correction signal, for adjusting a refractive index of said light beam.

2. The optical pickup device as claimed in claim 1, wherein said deflection angle adjusting means comprises an acousto-optical device, and said refractive index adjusting means comprises an electro-optical device.

3. The optical pickup device as claimed in claim 2, wherein said acousto-optical device is made from crystals of $LiNbO_3$, and said electro-optical device is made from crystals of PLZT.

4. The optical pickup device as claimed in claim 1, wherein said deflection angle adjusting means and said refractive index adjusting means are disposed between said lens means and said recording medium.

5. The optical pickup device as claimed in claim 1, further comprising:

mechanic driving means for mechanically re-positioning the optical pickup device to grossly adjust the position of said spot on said recording medium in a direction transverse to said tracks.

6. The optical pickup device as claimed in claim 5 wherein said control means generates a gross tracking error correction signal when said deviation is greater than a predetermined value;

said mechanic driving means mechanically re-positioning the optical pickup device in response to said gross tracking error correction signal.

7. The optical pickup device as claimed in claim 6 wherein said predetermined value is 108 microns.

* * * * *